United States Patent Office 2,994,670
Patented Aug. 1, 1961

2,994,670
STYRENE-GLYCIDYL ACRYLATE COPOLYMER FOAM
Gaetano F. D'Alelio, South Bend, Ind., assignor to Koppers Company, Inc., a corporation of Delaware
No Drawing. Filed June 24, 1958, Ser. No. 744,070
3 Claims. (Cl. 260—2.5)

This invention relates to solvent-resistant foams having improved stability to heat, and the method of their preparation. In one specific aspect, it relates to styrene-glycidyl acrylate expandable polymeric materials, the foams made from such materials, and the method involved in the preparation of the expandable materials and foams.

Polystyrene foam, because of its low density and evenly fused surfaces, has become widely accepted as a construction and insulation material. Unfortunately, the physical properties of this foam limit its use for insulation purposes to some extent. At temperatures above about 115° C. polystyrene foam shrinks considerably and because of this lack of dimensional stability at higher temperatures, it is unsuitable for insulating steam pipes, hot water pipes, and other conduits for hot liquids or gases. Thus, it is unsatisfactory as an insulation material for the heater element of self defrosting refrigerators. In addition to its inability to withstand higher temperatures, polystyrene foam is soluble in the common solvents. Hence, it is not effective as an insulation material to prevent evaporation of oil components from storage facilities.

I have discovered a novel polymeric foam, comparable to polystyrene foam in its appearance, surface fusion, density, and void size, which is, in addition, substantially insoluble in common solvents and dimensionally stable up to temperatures of about 150° C.

It is, therefore, an object of the present invention to provide a polymeric foam having solvent resistance and improved dimensional stability at higher temperatures. It is a further object to provide a method for making this novel polymeric material.

The foams of the present invention comprise a foamed, cross-linked copolymer containing 70–90 percent by weight of styrene and 10–30 percent by weight of glycidyl acrylate. The copolymeric foam is made by the volatilization from within the solid copolymer of a volatile aliphatic hydrocarbon boiling in the range of 35–100° C. The foam is cross-linked by a plurality of linkages formed by reaction of the oxirane groups of the glycidyl acrylate with a cross-linking agent that contains at least two active hydrogen equivalents per molecule which are located at different sites on the molecule. In preparing the foam, the cross-linking agent is generally present in an amount of 1–3 active hydrogen equivalents for each oxirane group of the glycidyl acrylate.

The composition of the copolymer must be carefully controlled within the above ranges to produce the solvent-resistant, heat-stable foams of the invention. If the copolymer comprises less than 10 percent by weight glycidyl acrylate, the resulting foam will be soluble in common solvents and will have reduced dimensional stability at high temperatures. It is difficult to prepare copolymers containing more than 30% by weight of the glycidyl acrylate.

In preparing the foams of the invention, the choice of cross-linking agent may vary widely. Generically, the cross-linking agents are compounds that contain at least two active hydrogen equivalents per molecule, which are located at different sites on the molecule, i.e. poly-functional compounds containing a group reactive with the oxirane ring of the styrene-glycidyl acrylate copolymer. Certain amines and amides are typical of such polyfunctional compounds. Representative compounds which may be used alone or in admixture with each other are ethylenediamine, hexamethylenetetramine, phenylenediamine, N-aminopropylmorpholine, 2,2-aminoethylaminoethanol, polyglycolamine, triethylenetetramine, toluenediamine, diethylenetriamine, toluenediamine in aniline, Versamide (di and trimerized fatty acids reacted with polyamines such as ethylene diamine), tetraethylene pentamine, pentaethylene hexamine, methyl amino propylamine, and isopropyl amino propylamine.

Also useful as cross-linking agents are solid polyamines of the class of aliphatic, mononuclear aromatic, polynuclear aromatic, condensed polynuclear aromatic, and heterocyclic compounds (polyamines being those compounds of such classes wherein the compounds contain two or more nitrogen atoms having attached thereto one or more hydrogen atoms, termed "amine hydrogen," available for reaction with the oxirane oxygen of the styrene glycidyl acrylate copolymer. Representative solid aliphatic polyamine compounds are 1,6-hexanediamine; 1,10-decanediamine; and 1,18-octadecanediamine; representative mononuclear polyamines are o, m, or p-phenylenediamine; N,N'-di-2-naphthyl-p-phenylenediamine; diaminophenol; diaminophenol-HC-1,2,4-diaminoanisol; and 4-methoxy-6-methyl-m-phenylenediamine; representative aromatic polynuclear polyamines are benzidene; 2-4-diamine azobenzene; N,N'-diphenylethylenediamine; 4,4'-diaminodiphenylsulfone; 2,2'-diamino-4,4-dinitrodiphenylmethane; p,p''-methylenedianiline; representative aromatic condensed polynuclear amines are 2,3; 1,8, and 1,5-diaminonaphthalenes; 1,4-diamino anthraquinone, and 1,3-diamino dihydro-anthraquinone; and representative heterocyclic polyamines are 2,6-diaminopyridine, 2,4-diamino-6-hydroxy primidine, and 3,6-diamino-9-methyl carbazole.

In addition to the amines and amides suitable as cross-linking agents in the foams of the invention, dicarboxylic acids and their anhydrides and arylene diisocyanates are quite suitable. For example, the arylene diisocyanates include 2,4-toluene diisocyanate, phenylene diisocyanates, 2,6-toluene diisocyanate, 1,5-naphthalene diisocyanate, 1-chlorophenylene-2,4-diisocyanate, 4,4'-xenylenediisocyanate, and the like. Useful di-basic acids and anhydrides include succinic acid, maleic acid, isophthalic acid, phthalic acid, itaconic acid, malic acid, citric acid, terephthalic acid, phthalic anhydride, maleic anhydride, and the like.

During foaming, the ross-linking agent is generally present in an amount corresponding to 1–3 active hydrogen equivalents per oxirane group of the glycidyl acrylate. If less than one equivalent of cross-linking agent is used, sufficient cross-linking does not occur and the foam product is soluble in common solvents. The upper limit of the amount of cross-linking agent depends upon the efficiency of the mixing of the cross-linking agent with the copolymer. No particular advantage is seen in using greater than three equivalents of cross-linking agent.

In preparing the expandable styrene-glycidyl acrylate materials, hereafter called beads, a commercially available styrene-glycidyl acrylate copolymer containing from 70–90 percent by weight styrene and from 10–30 percent by weight glycidyl acrylate is used. These copolymers are prepared by polymerization of glycidyl acrylate monomer with styrene in suspension, emulsion, or in bulk by methods similar to that of polymerizing styrene monomer by itself.

The copolymer particles, or beads, made by any of the foregoing procedures, are rendered expandable by the incorporation therein of a volatile aliphatic hydrocarbon boiling in the range of 35–100° C., e.g. petroleum ether, by the general method described in my copending application S.N. 394,230. By the method of that application, a stable, aqueous suspension is formed containing the polymer particles and the aliphatic hydrocarbon. Intimate contact is maintained between the hydrocarbon and the polymer, thereby incorporating into the particles from 5–30 percent by weight of the hydrocarbon, based upon the weight of the particles. The suspensions are stabilized by an organic or inorganic stabilizing or suspensing agent. Among the organic dispersants, polyvinyl alcohol and alkyl aryl sulfonates are quite suitable. The inorganic dispersants include zinc oxide, calcium carbonate, bentonite, talc, kaolin, calcium phosphate, aluminum oxide, barium sulfate, magnesium carbonate, and the like. Particularly effective are the difficultly soluble phosphates described in U.S. Patent 2,594,913 of J. M. Grim. Generally, impregnation of the polymeric particles is accomplished by maintaining the stabilized suspension at temperatures between 70 and 90° C. for from 2–4 hours.

After the desired impregnation with the aliphatic hydrocarbon is attained, the copolymer beads are de-watered and washed. Generally, if an organic stabilizing agent is used in the suspension, a water wash is sufficient. If an inorganic dispersant such as calcium phosphate is used, the pH of the suspension containing the beads is adjusted to below about 1.8 by the addition of the strong mineral acid, e.g. HCl or HNO$_3$. The suspension medium is drained off, and a water wash is then used to remove free acid from the copolymer beads.

Copolymer beads are dried at ambient or slightly elevated temperatures. Drying conditions vary with the thickness of the layer of beads to be dried. The beads may be simply spread on a flat surface and allowed to dry at room temperatures until they are free-flowing. In commercial practice, expandable beads are placed in a forced circulation oven for from 10–20 minutes at about 120–140° F. Drying time and temperature vary with degree of air circulation achieved at the oven and the thickness of the bead layer to be dried. Care is taken to avoid any substantial volatilization of the aliphatic hydrocarbon from within the beads.

The expandable styrene-glycidyl acrylate copolymer beads are then blended with a cross-linking agent having active hydrogens, of the type hereinbefore described. Both solid and liquid cross-linking agents can be intimately and uniformly blended with the copolymer by a simple physical mixing. Care is taken during the mixing operation to provide a uniform blend of cross-linking agent and copolymer. Since the contact between the cross-linking agent and the copolymer occurs primarily on the surface of the copolymer, only limited reaction occurs before the application of heat. When the liquid cross-linking agents are used, the contact is better and hence, the reaction is more rapid. In this latter case, the foams must be formed before considerable cross-linking occurs, since the completely cross-linked copolymer is incapable of sufficient expansion.

The expandable copolymer particles having the cross-linking agent integrated therewith are expanded into low density copolymer foams having smooth, fused surfaces and small voids. Expansion is accomplished by steam, hot water, infrared or radio frequency means by processes will-known in the art. An effective method of expansion with steam is described in the copending application of William C. Teach et al., S.N. 571,137, filed March 13, 1956, now abandoned.

The copolymer foams are then heated to effect curing or cross-linking. Curing is accomplished by heating the foams at temperatures of 80–135° C. for a short period of time, e.g. 15 to 30 minutes. The foams can be cured for a much longer time, e.g. 96 hours (Example III, infra.) but no particular advantage is derived therefrom. The curing time depends to a large extent upon the curing temperature and the cross-linking agent used. It is possible to cure and foam concomitantly if a longer retention time, e.g. 5 to 10 minutes, is used during foaming.

The cured foams are insoluble in toluene and other common solvents, which makes them eminently suitable as insulation materials to prevent evaporation in oil storage facilities. Moreover, these foams exhibit surprising dimensional stability at temperatures up to 150° C.

My invention is further illustrated by the following examples.

EXAMPLE I

Expandable copolymer beads were made using a copolymer comprising 86.4% by weight styrene and 13.6% by weight glycidyl acrylate by preparing a suspension having the following formulation:

90 parts copolymer beads
10 parts petroleum ether (B.P. 30–60° C.)
2.2 parts tri-calcium phosphate
0.005 part sodium dodecyl benzene sulfonate (Nacconol NRSF)
101.4 parts water The suspension was maintained at 90° C. for 2 hours. Dilute hydrochloric acid was added thereto to adjust the pH to about 1.8. The suspension medium was drained off and the beads were washed with distilled water.

The expandable beads were divided into two portions. One portion was intimately mixed with one equivalent of ethylenediamine (based upon active hydrogens available to react with the linkages of the oxirane ring of the glycidyl acrylate) and the other with 3 active hydrogen equivalents of ethylenediamine. Foam products were made from samples of both portions of expandable beads by placing the samples in a mold and exposing them to steam for 5 minutes. Samples of the foams thus produced were placed in an oven and heated at 105° C. for ½ hour. The cured products were substantially insoluble in toluene at room temperature.

EXAMPLE II

The procedure of Example I was repeated using a copolymer comprising 82.1% by weight styrene and 17.9% glycidyl acrylate. The expandable copolymer beads were intimately blended with one active hydrogen equivalent of ethylenediamine and thereafter expanded in a mold in the presence of steam. A sample of the foam thus produced was found to be somewhat soluble in toluene at room temperature. The remaining portion of the copolymer foam was heated in an oven at 90° C. for 24 hours to attain complete curing. The curing treatment yielded a product which was insoluble in toluene at room temperature.

Three samples of the cured foam were further heated in an oven for ½ hour at temperatures of 125, 135, and 145° C., respectively. The samples expanded slightly at these temperatures and the final size of the treated samples was slightly greater than that of the original samples, thus demonstrating that the foams were dimensionally stable at elevated temperatures. The size of the foam was determined by volume displacement in water.

EXAMPLE III

Using the procedure of Example I, expandable copolymer beads were made with a copolymer comprising 91.9% by weight styrene and 8.1% glycidyl acrylate. The copolymer beads were divided into 10 portions. Five of the portions were treated with one active hydrogen equivalent of ethylenediamine, hexamethylenetetramine, succinic acid, phthalic anhydride, and phenylenediamine, respectively. The remaining five portions were treated with three active hydrogen equivalents of the cross-linking agent. The samples were expanded in a mold in the presence of steam to yield foam products which were satisfactory in surface fusion, void size, and skin appearance. All of the foams were somewhat soluble in toluene at room temperature. Three ½ inch cubes of each of the foamed products were placed in an oven at 90° C., for 24, 48, and 96 hours, respectively, to attain complete curing. This treatment yielded products that were insoluble in toluene at room temperature.

Portions of all of the cured foamed products were tested for their dimensional stability by heating them in an oven at 105, 115, 125, 135, and 145° C. for ½ hour. Considerable shrinkage of all foams occurred at 125, 135, and 145° C.

EXAMPLE IV

The expandable polymeric foams of Examples I and II were compared with polystyrene foam in respect of dimensional stability, using the testing procedure described in the previous examples. The results are shown hereunder in the table.

Table I

DIMENSIONAL STABILITY OF CROSS-LINKED STYRENE GLYCIDYL ACRYLATE COPOLYMER FOAMS COMPARED WITH POLYSTYRENE FOAMS

| Expandable Styrene-Glycidyl Acrylate Copolymer, Weight Ratio [1] | Oven Temp. (° C.) [2] | Volume Displacement of Sample in Cubic Centimeters | |
|---|---|---|---|
| | | Before Heating | After Heating |
| 86.4/13.6 | 105 | 2.8 | 9.5 |
| 86.4/13.6 | 115 | 2.8 | 10.0 |
| 86.4/13.6 | 125 | 2.8 | 8.0 |
| 86.4/13.6 | 135 | 2.8 | 2.8 |
| 86.4/13.6 | 145 | 2.8 | 3.1 |
| 82.1/17.9 | 105 | 2.8 | 5.9 |
| 82.1/17.9 | 115 | 2.8 | 5.0 |
| 82.1/17.9 | 125 | 2.8 | 3.5 |
| 82.1/17.9 | 135 | 2.8 | 4.5 |
| 82.1/17.9 | 145 | 2.8 | 4.0 |
| 100/0 | 105 | 2.8 | 4.5 |
| 100/0 | 115 | 2.8 | 4.5 |
| 100/0 | 125 | 2.8 | 2.3 |
| 100/0 | 135 | 2.8 | 0.8 |
| 100/0 | 145 | 2.8 | 0.5 |

[1] The expansible styrene-glycidyl acrylate copolymer beads were mixed with one active hydrogen equivalent of ethylenediamine per epoxy group.
[2] Time in oven was 30 minutes.

The data make it compelling clear that the foams of the present invention are vastly superior to polystyrene foam in respect to their dimensional stability at temperatures above 115° C.

I claim:

1. A foamed product which is dimensionally stable at temperatures up to about 150° C., consisting of a styrene-glycidyl acrylate copolymer containing from 70–90 percent by weight styrene and 10–30 percent by weight glycidyl acrylate, said copolymer being cross-linked with a cross-linking agent having at least two active hydrogen equivalents per molecule which are located at different sites on the molecule, said agent being selected from the group consisting of amines, amides, dicarboxylic acids and dicarboxylic acid anhydrides and being present before curing in an amount equal to at least one active hydrogen equivalent for each oxirane group of the glycidyl acrylate, prepared by intimately blending particles of a foamable copolymer, having the aforesaid chemical composition and having integrated therewith 5–30 percent by weight, based on the weight of said copolymer of a volatile aliphatic hydrocarbon boiling in the range of 35–100° C., with said cross-linking agent in the amount specified aforesaid, heating the blended material to volatilize said hydrocarbon therefrom to form an integral cellular foam at a temperature below that at which considerable cross-linking occurs during a predetermined time interval, and curing said foam by heating at a temperature of 80 to 135° C. for at least 15 minutes.

2. A foamed product which is dimensionally stable at temperatures up to about 150° C., consisting of a styrene-glycidyl acrylate copolymer containing from 70–90 percent by weight styrene and 10–30 percent by weight glycidyl acrylate, said copolymer being cross-linked with ethylenediamine, said ethylenediamine being present before curing in an amount equal to at least one active hydrogen equivalent for each oxirane group of the glycidyl acrylate, prepared by intimately blending particles of a foamable copolymer, having the aforesaid chemical composition and having integrated therewith 5–30 percent by weight, based on the weight of said copolymer of a volatile aliphatic hydrocarbon boiling in the range of 35–100° C., with said ethylenediamine in the amount specified aforesaid, heating the blended material to volatilize said hydrocarbon therefrom to form an integral cellular foam at a temperature below that at which considerable cross-linking occurs during a predetermined time interval, and curing said foam by heating at a temperature of 80 to 135° C. for at least 15 minutes.

3. A foamed product which is dimensionally stable at temperatures up to about 150° C., consisting of a styrene-glycidyl acrylate copolymer containing from 70–90 percent by weight styrene and 10–30 percent by weight glycidyl acrylate, said copolymer being cross-linked with a cross-linking agent having at least two active hydrogen equivalents per molecule which are located at different sites on the molecule, said agent being selected from the group consisting of amines, amides, dicarboxylic acids and dicarboxylic acid anhydrides and being present before curing in an amount equal to one to three active hydrogen equivalents for each oxirane group of the glycidyl acrylate, prepared by intimately blending particles of a foamable copolymer, having the aforesaid chemical composition and having integrated therewith 5–30 percent by weight, based on the weight of said copolymer of a volatile aliphatic hydrocarbon boiling in the range of 35–100° C., with said cross-linking agent in the amount specified aforesaid, heating the blended material to volatilize said hydrocarbon therefrom to form an integral cellular foam at a temperature below that at which considerable cross-linking occurs during a predetermined time interval, and curing said foam by heating at a temperature of 80 to 135° C. for 15–30 minutes.

References Cited in the file of this patent

UNITED STATES PATENTS

| 2,580,901 | Erickson et al. | Jan. 1, 1952 |
| 2,781,335 | Cupery | Feb. 12, 1957 |

FOREIGN PATENTS

| 756,654 | Great Britain | Sept. 5, 1956 |